United States Patent
Oshita et al.

(10) Patent No.: US 8,408,089 B2
(45) Date of Patent: Apr. 2, 2013

(54) ENERGY ABSORBING STEERING COLUMN

(75) Inventors: Morito Oshita, Kariya (JP); Hidetoshi Inayoshi, Nukata-gun (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 801 days.

(21) Appl. No.: 12/500,312

(22) Filed: Jul. 9, 2009

(65) Prior Publication Data

US 2010/0031768 A1   Feb. 11, 2010

(30) Foreign Application Priority Data

Aug. 8, 2008 (JP) ................................. 2008-204941

(51) Int. Cl.
  *B62D 1/19*   (2006.01)
(52) U.S. Cl. ............. 74/492; 74/493; 280/775; 280/777
(58) Field of Classification Search .................... 74/493, 74/492; 280/775, 777
  See application file for complete search history.

(56) References Cited

U.S. PATENT DOCUMENTS

| | | | |
|---|---|---|---|
| 6,113,275 A * | 9/2000 | Blase | 384/296 |
| 6,623,036 B2 * | 9/2003 | Yamamura et al. | 280/775 |
| 7,168,741 B2 * | 1/2007 | Kinme et al. | 280/777 |
| 2007/0151392 A1 | 7/2007 | Oshita et al. | |

FOREIGN PATENT DOCUMENTS

| | | | |
|---|---|---|---|
| JP | 61-135861 A | | 6/1986 |
| JP | 63-43978 U | | 3/1988 |
| JP | 1-172965 U | | 7/1989 |
| JP | 08-085462 A | | 4/1996 |
| JP | 2000-219139 | * | 8/2000 |
| JP | 2007-168569 A | | 7/2007 |
| JP | 2008-018780 A | | 1/2008 |

OTHER PUBLICATIONS

Office Action issued by Japan Patent Office on Dec. 11, 2012 in corresponding Japanese Patent Application No. 2008-204941, and English translation thereof.

* cited by examiner

*Primary Examiner* — William C Joyce
(74) *Attorney, Agent, or Firm* — Buchanan Ingersoll & Rooney PC (57) ABSTRACT

An energy absorbing steering column includes a first cylindrical member for accommodating a steering shaft of a vehicle and a second cylindrical member for accommodating the first cylindrical member and normally supporting the first cylindrical member in a predetermined position to allow the first cylindrical member to axially move relative to the second cylindrical member upon a predetermined or greater load applied to the steering shaft. The first cylindrical member includes first and second enlarged diameter portions, and the second cylindrical member includes first and second supporting portions. An elastic bush is provided between the first enlarged diameter portion and the first supporting portion for applying elastic force for supporting the steering shaft to restrict an axial movement of the first cylindrical member relative to the second cylindrical member.

10 Claims, 5 Drawing Sheets

Prior Art

ENERGY ABSORBING STEERING COLUMN

CROSS REFERENCE TO RELATED APPLICATIONS

This application is based on and claims priority under 35 U.S.C. §119 to Japanese Patent Application 2008-204941, filed on Aug. 8, 2008, the entire content of which is incorporated herein by reference.

FIELD OF THE INVENTION

The present invention relates to an energy absorbing steering column. More particularly, the invention pertains to an energy absorbing steering column that absorbs energy applied to a steering column of a vehicle.

BACKGROUND

An energy absorbing steering column mounted on a vehicle, which has characteristics to absorb energy applied to the steering wheel, is well known as a means to alleviate an impact applied to the steering column. Among a variety of structures adopted in the energy absorbing steering column, for example, a ball type where a ball is provided between an outer tube and an inner tube of a steering column, a mesh type where a metallic mesh structure is used in the steering column, a silicon rubber type where silicon rubber sealed in a lower tube is ejected from a slit when an upper tube moves into the lower tube, and the like are used.

According to JP2007-168569A (hereinafter referred to as Reference 1), the energy absorbing steering shaft includes a metallic elastic bush provided between the first cylindrical member and the second cylindrical member for applying a radial elastic force for biasing a first press-fit portion and a first supporting portion in the radial direction, thereby supporting the steering shaft to restrict an axial movement of the first cylindrical member relative to the second cylindrical member. Further, the first cylindrical member includes a second press-fit portion and a slit formed near a front open end of the first cylindrical member in a front-rear direction of a vehicle by cutting a predetermined area in an axial direction, thereby supporting the steering shaft under a condition that the axial movement of the first cylindrical member relative to the second cylindrical member is restricted. Consequently, a load for starting a movement, at which a relative axial movement of the first cylindrical member and the second cylindrical member starts, is set easily and appropriately.

According to the steering column disclosed in the Reference 1, the load for starting a movement is set easily and appropriately. The steering column is structured so that the radial movement of the first cylindrical member relative to the second cylindrical member is restricted by way of a biasing force applied by the metallic elastic bush provided between the first press-fit portion of the first cylindrical member and the first supporting portion of the second cylindrical member near a rear open end in the front-rear direction of the vehicle, and by way of a biasing force between the second press-fit portion of the first cylindrical member having the slit and a second supporting portion of the second cylindrical portion near the front open end. However, when the metallic elastic bush is provided near the rear open end, a large and repetitive load is applied to the metallic elastic bush compared to when the metallic elastic bush is provided near the front open end, which requires a metallic elastic bush made of robust material to withstand the large and repetitive load, invariably resulting in a high cost. Further, a flat portion needs to be formed on an inner tube, and burrs develop during a conventional cutting work for forming the flat portion, which needs to be removed. Still further, a cylindrical blank material having enough thickness needs to be used for assuring necessary rigidity, considering that the cylindrical blank material will be thinned when performing the cutting work, which causes a waste.

A need thus exists for an energy absorbing steering column which is not susceptible to the drawback mentioned above.

SUMMARY OF THE INVENTION

In light of the forgoing, an energy absorbing steering column includes a first cylindrical member for accommodating a steering shaft of a vehicle and rotatably supporting the steering shaft about an axis thereof, the first cylindrical member including a first front open end and a first rear open end in a front-rear direction of the vehicle, a first enlarged diameter portion formed near the first front open end and a second enlarged diameter portion formed at a predetermined distance in an axial direction of the first cylindrical member from the first front open end; a second cylindrical member for accommodating the first cylindrical member, normally supporting the first cylindrical member in a predetermined position and allowing the first cylindrical member to axially move relative to the second cylindrical member upon a predetermined or greater load applied to the steering shaft, the second cylindrical member including a second front open end and a second rear open end in the front-rear direction of the vehicle, a first supporting portion formed on an inner surface of the second cylindrical member at a predetermined distance in an axial direction of the second cylindrical member from the second rear open end, and a second supporting portion formed on the inner surface of the second cylindrical member near the second rear open end and; an elastic bush provided between the first enlarged diameter portion and the first supporting portion for applying elastic force in a radial direction of the elastic bush for supporting the steering shaft to restrict an axial movement of the first cylindrical member relative to the second cylindrical member.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
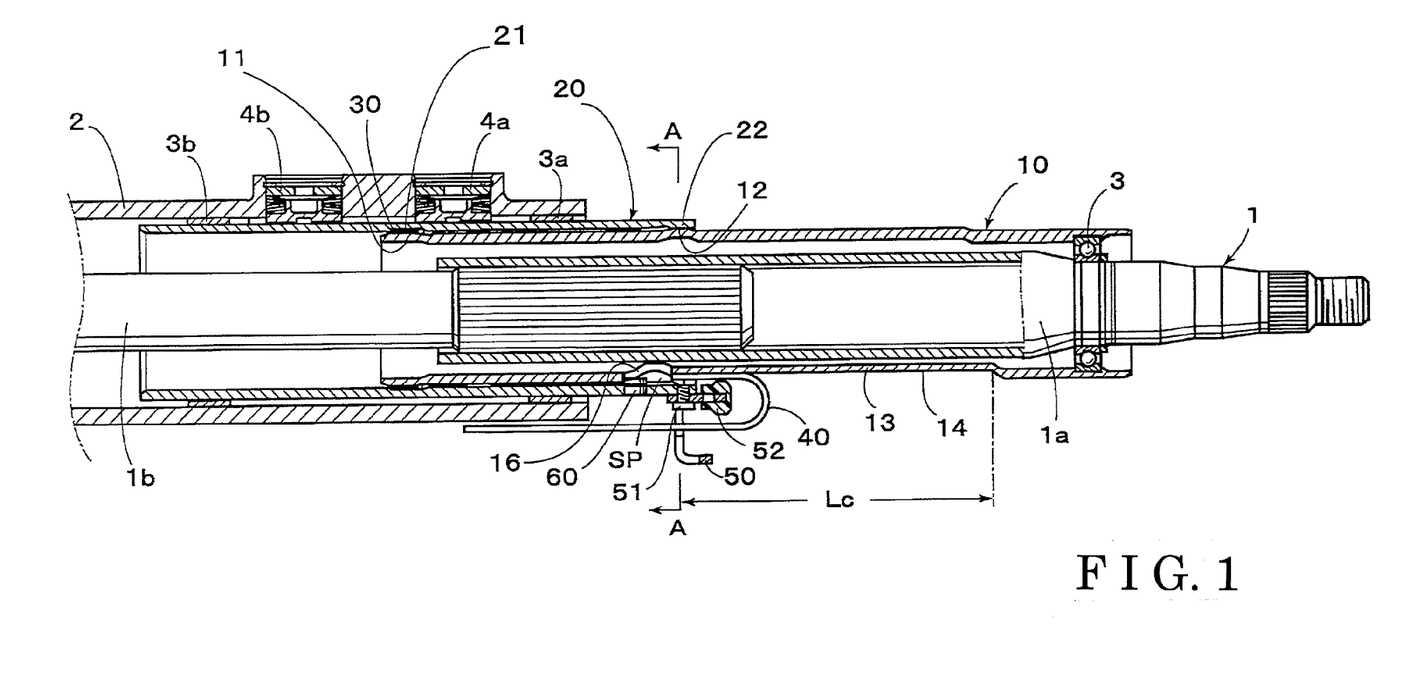
FIG. 1 is a cross-sectional view of an energy absorbing steering column according to an embodiment of the present invention.

An embodiment of the present invention will be explained with reference to the illustrations as follows. In this embodiment, the terms "front" and "rear" are used based on a front-rear direction of the vehicle. FIG. 1 shows a structure of an energy absorbing steering column related to the embodiment of the present invention. A steering shaft 1 is constituted by an upper shaft 1a and a lower shaft 1b that is spline connected to an inner surface of the upper shaft 1a. The upper shaft 1a has a cylindrical shape and a steering wheel is connected to a rear end portion of the upper shaft 1a. That is, the upper shaft 1a is connected to the lower shaft 1b so as to move in an axial direction of the lower shaft 1b but not to rotate relative to the lower shaft 1b. A front end portion of the lower shaft 1b is connected to a steering mechanism. The steering shaft 1 is mounted on a body of the vehicle by a bracket via a column housing 2 so that the steering shaft 1 makes a predetermined angle (for example, 25 degrees) relative to a floor of the vehicle.

The column housing 2 houses therein an inner tube 10 which is made of metal and includes a first front open end and a first rear open end. The inner tube 10 serves as a first cylindrical member accommodating therein the steering shaft 1 so that the steering shaft 1 is rotatable about an axis thereof. That is, the inner tube 10 accommodates therein the upper shaft 1a so as to rotatably support the upper shaft 1a via a bearing 3 provided in a rear end portion of the inner tube 10. The upper shaft 1a and the inner tube 10 are structured so that they move together as a unit in the axial direction of the upper shaft 1a but that a relative axial movement of the upper shaft 1a and the inner tube 10 to each other is restricted. In addition, the column housing 2 houses therein an outer tube 20 which is made of metal and includes a second front open end and a second rear open end. The outer tube 20 serves as a second cylindrical member accommodating therein the inner tube 10 and normally supporting the inner tube 10 in a predetermined position. The inner tube 10 and the outer tube 20 are structured so as to allow the inner tube 10 to move relative to the outer tube 20 in the axial direction thereof when a predetermined or greater load is applied to the steering shaft 1, thereby allowing the upper shaft 1a to move relative to the outer tube 20 in the axial direction. In this embodiment, the inner tube 10, the outer tube 20 and an elastic bush 30 that is made of metal, which are structured as shown in an enlarged view in FIG. 2, function as an energy absorption means.

The outer tube 20 is supported by the column housing 2 via bearings 3a, 3b in a manner that the outer tube 20 is pressed against an inner surface of the column housing 2 by friction mechanisms 4a, 4b by use of coned disc springs. Consequently, sliding properties of the steering wheel in a thrust direction are ensured without causing looseness. However, a relation between the steering column housing 2 and the outer tube 20 does not function as an energy absorption mechanism.

Figure 2:
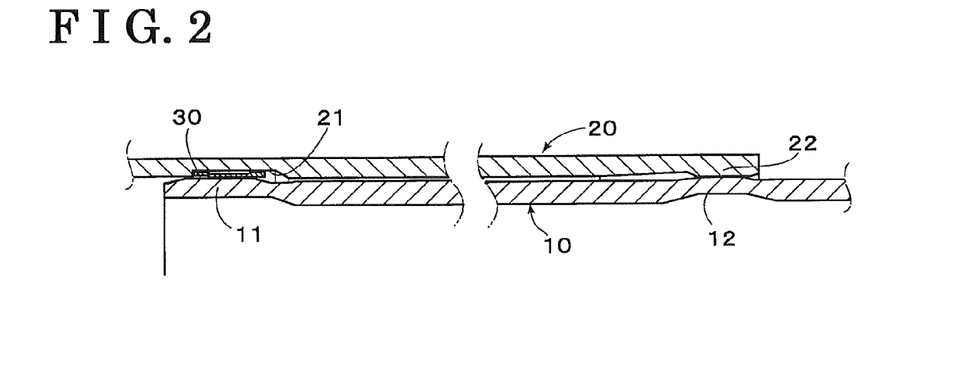
FIG. 2 is an enlarged cross-sectional view showing a relation between an inner tube and an outer tube each illustrated in FIG. 1.

The outer tube 20 of this embodiment includes on an inner surface thereof a first supporting portion 21 and a second supporting portion 22. The first supporting portion 21 is located at a predetermined distance from the second rear open end in the axial direction of the outer tube 20. The second supporting portion 22 is located near the second rear open end. The first supporting portion 21 is constituted by an annular recess formed on an inner circumferential surface of the outer tube 20, and the second supporting portion 22 is constituted by an annular protrusion integrally formed on the inner circumferential surface of the outer tube 20 so as to protrude inward in a radial direction of the outer tube 20.

In the meantime, the inner tube 10 includes a first enlarged diameter portion 11 and a second enlarged diameter portion 12. The first enlarged diameter portion 11 has an enlarged diameter and is located near the first front open end, and the second enlarged diameter portion 12 has an enlarged diameter and is located at a predetermined distance from the first front open end in the axial direction of the first cylindrical member 10. In this embodiment, the first enlarged diameter portion 11 and the second enlarged diameter portion 12 are respectively formed so as to protrude outward in a radial direction of the inner tube 10. On an outer circumferential surface of the outer tube 20, a portion at which the first enlarged diameter portion 11 faces the first supporting portion 21 and a portion at which the second enlarged diameter portion 12 faces the second supporting portion 22 are cut and removed so as to be flat (shown in FIG. 4 with numerical designation 15).

Figure 3:
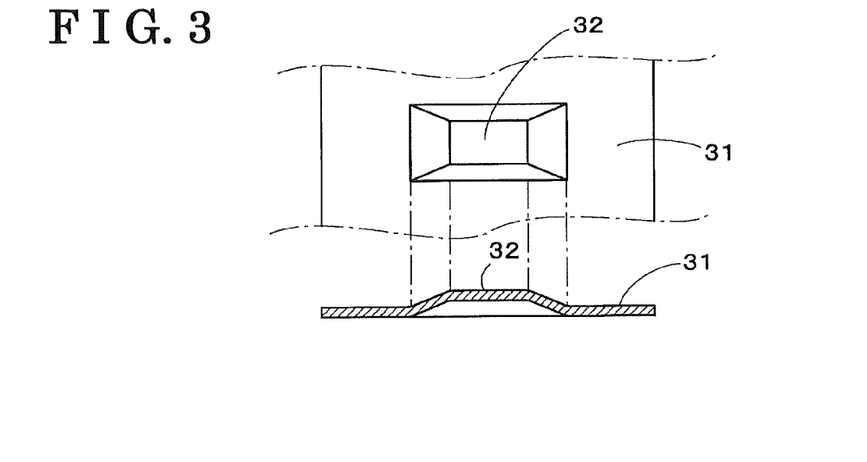
FIG. 3 represents a plan view and an across-section view of a protrusion formed by way of drawing on an elastic bush according to the embodiment of the present invention.

As shown in the enlarged view of FIG. 2, the elastic bush 30 is positioned between the first enlarged diameter portion 11 and the first supporting portion 21 so as to apply an elastic force in a radial direction of the elastic bush 30. In this embodiment, the elastic bush 30 may be made, for example, of stainless steel, and include a cylindrical portion 31 having a C-shaped cross section and plural protrusions 32 (represented by one protrusion 32 in FIG. 3) formed on the cylindrical portion 31. In this embodiment, the plural protrusions 32 are formed by way of drawing on the cylindrical portion 31 so as to be aligned in a circumferential direction of the cylindrical portion 31 with predetermined spaces between adjacent protrusions, and so as to respectively protrude inward in a radial direction of the cylindrical portion 31. Each protrusion 32 is formed to have a trapezoidal-shaped cross section, however, the protrusion 32 may be formed to have an outwardly curved surface.

When the elastic bush 30 having the above-mentioned structure is positioned between the first enlarged diameter portion 11 and the first supporting portion 21 as shown in FIGS. 1 and 2, each protrusion 32 is compressively deformed and a restoring elastic force of the protrusions 32 is applied in the radial direction, thereby expanding a clearance between the inner tube 10 and the outer tube 20. The restoring elastic force ensures frictional force between the elastic bush 30 and each of the inner tube 10 and the outer tube 20, and thus the steering shaft 1 is supported under a condition that the relative axial movement between the inner tube 10 and the outer tube 20 is restricted. A height of each protrusion 32 formed by way of drawing is set to around a presetting height. A diameter difference between the inner tube 10 and the outer tube 20, and the height of the protrusion 32 are set so that the first enlarged diameter portion 11 responds to an axial load relatively insensitively, but is displaced relatively easily by an external force. On the contrary, the second enlarged diameter portion 12 of the inner tube 10 is press fitted into the second supporting portion 22 of the outer tube 20. A press fit allowance of the inner tube 10 and the outer tube 20 is set so that the second enlarged diameter portion 12 responds to the axial load relatively sensitively, but it is harder for the second enlarged diameter portion 12 to be displaced by the external force. Consequently, the inner tube 10 is properly supported relative to the outer tube 20 without causing the looseness in the steering wheel.

Further, the inner tube 10 includes a reduced diameter portion 13 formed between a position where the second enlarged diameter portion 12 is supported by the second supporting portion 22 and a position near the first rear open end (referred to as Lc in FIG. 1). Across the reduced diameter portion 13, a diameter of the inner tube 10 is continuously reduced in a part of a circumference thereof. Still further, the inner tube 10 includes a flat portion 14 formed by cutting and removing a part of an outer circumferential surface of the reduced diameter portion 13. For example, as shown in FIG. 4, the second enlarged diameter portion 12 is formed to have the inner diameter Ra, the reduced diameter portion 13 is formed to have the inner diameter Rb (Rb<Ra), and the reduced diameter portion 13 is formed on the part of the circumferential surface of the inner tube 10 so that an angle α (for example, α is 90 degrees or less) is formed in the radial center of the inner tube 10.

In this embodiment, the inner tube 10 is made by performing a deformation processing, more particularly, a hydroforming processing on a cylindrical blank material, during which the first enlarged diameter portion 11, the second enlarged diameter portions 12 and the reduced diameter portion 13 are formed. After that, the part of the outer circumferential surface of the reduced diameter portion 13 is cut and removed by use of an end mill to form the flat portion 14. As a result, as shown in FIG. 4, the second enlarged diameter portion 12 and the reduced diameter portion 13 are smoothly connected to have a smooth corner therebetween. That is, no burrs are left during an end milling process and thus a process of removing burrs is unnecessary. On the contrary, in a conventional method, a cutting work is performed on a conventional inner tube 10x to form thereon a conventional flat portion 14x, where a cross sectional shape of the conventional inner tube 10x includes edges instead of the smooth corners, and thus generation of the burrs is unavoidable. Accordingly, the flat portion 14 of this embodiment is formed with ease and less cost. In addition, in this embodiment, a cross sectional shape of the inner tube 10 shown in FIG. 4 is obtained, and thus a section modulus of the inner tube 10 is greater than that of the conventional inner tube 10x having thereon the conventional flat portion 14x, thereby easily ensuring necessary rigidity. Here, the section modulus of the inner tube 10 of this embodiment is two to three times greater than that of the conventional inner tube 10x, however, this is only an example and the achievable section modulus varies depending on a size of the steering column.

Figure 4:
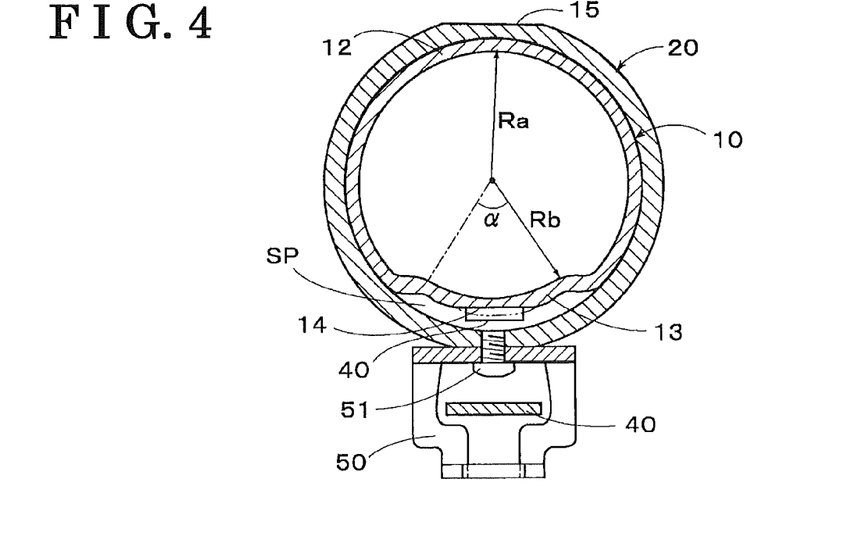
FIG. 4 is a cross-sectional view taken on line A-A of FIG. 1.
Figure 5:
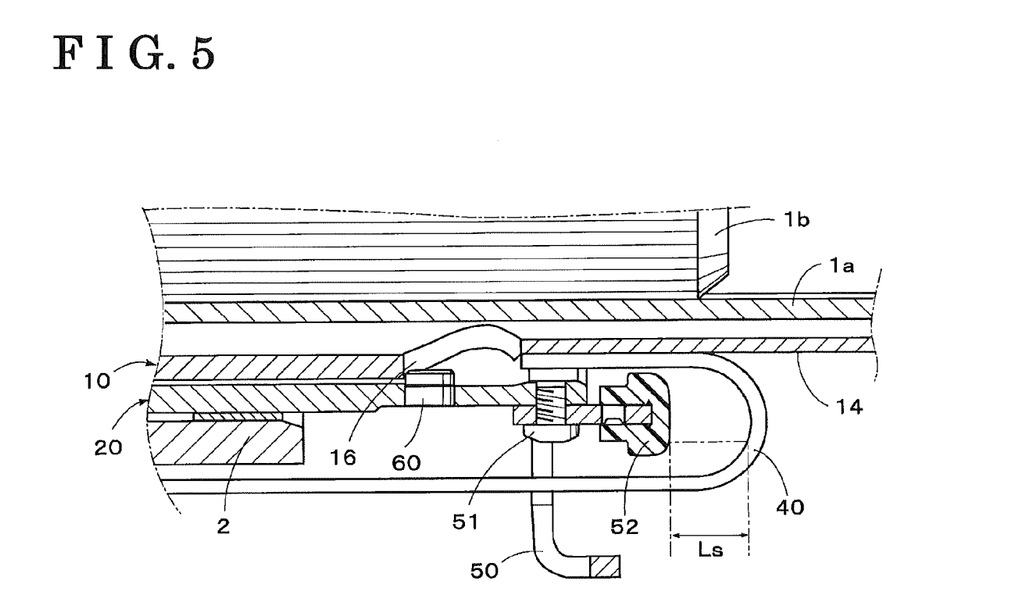
FIG. 5 is an enlarged cross-sectional view showing a relation between the inner tube and the outer tube near a second rear open end of the outer tube according to the embodiment of the present invention.
Figure 6:
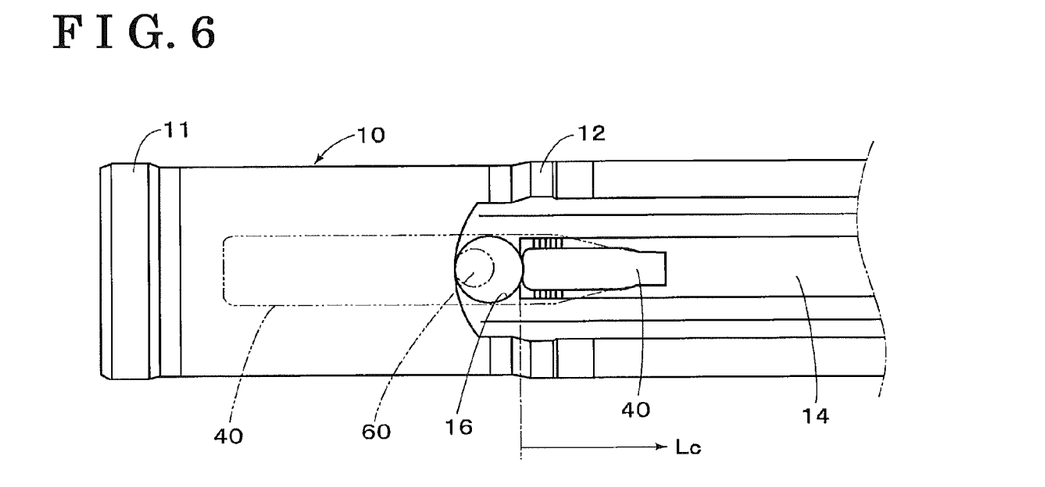
FIG. 6 is an enlarged plan view illustrating the inner tube near the second rear open end of the outer tube according to the embodiment of the present invention.

As shown in FIGS. 1 and 4, an axial space SP is provided between the outer circumferential surface of the reduced diameter portion 13 and the flat portion 14, and an inner circumferential surface of the outer tube 20. An energy absorption plate 40, or commonly referred to as an EA plate 40 (hereinafter referred to as a plate 40), is positioned in the axial space SP. The plate 40 serves as an elongated elastic plate member having elasticity, and one end thereof is welded to the flat portion 14 as shown in FIGS. 5 and 6. Alternatively, the end of the plate 40 may be securely attached to the flat portion 14 by caulking or by use of a pin, a rivet or the like.

As shown in FIGS. 1, 4 and 5, a guiding portion 50 having a shape of a frame is screwed by a screw 51 to an underside of the outer tube 20, near the second rear open end. As shown in FIGS. 1 and 4, a contact portion 52 is attached to the guiding portion 50, on a rear side of the vehicle. The guiding portion 50 may be in any shape as long as the guiding portion 50 includes an insertion opening through which a free end of the plate 40 is inserted and passes. The other end of the plate 40 is securely attached to the flat portion 14. The plate 40 is bent so as to form a lateral U shape and pass through the guiding portion 50. Accordingly, a predetermined clearance is provided between an inner surface of the lateral U shaped portion of the plate 40 and the contact portion 52 of the guiding portion 50.

In this embodiment, as shown in enlarged views of FIGS. 5 and 6, the outer circumferential surface of the inner tube 10 is cut and removed in the axial direction by the end mill to form the flat portion 14, and after that, a lock hole 16 is formed on the inner tube 10 by the same end mill. In the meantime, a lock pin 60 is securely attached to the outer tube 20, and the inner tube 10 and the outer tube 20 are assembled to each other under a condition that the lock pin 60 is engaged with the lock hole 16. Accordingly, as shown in FIG. 5, the lock pin 60 protrudes inwardly through the outer tube 20 so as to be engaged with the lock hole 16 at a front side wall thereof. However, a protruding height of the lock pin 60 is set so that the lock pin 60 does not come into contact with an outer surface of the flat portion 14, i.e. the lock pin 60 does not come into engagement with a rear side wall of the lock hole 16. Consequently, the inner tube 10 is reliably prevented from coming off the outer tube 20 in the rear direction of the vehicle.

As described above, in this embodiment, after the flat portion 14 is formed by the end mill, the lock hole 16 is formed by the same end mill by allowing the end mill to operate in a direction of an axial center of the inner tube 10 for machining efficiency. Therefore, as shown in FIGS. 5 and 6, a diameter of the lock hole 16 is formed to be substantially greater than an outer diameter of the lock pin 60. The lock pin 60 does not have to fully fit in the lock hole 16 and the lock hole 16 may be free from engagement with the lock pin 60 at the rear side wall of the lock hole 16 as long as the lock hole 16 and the lock pin 60 are structured so that the lock pin 60 contacts the front side wall of the lock hole 16.

Functions of the energy absorbing steering column having the above-mentioned structure will be described hereunder. Normally, the energy absorbing steering column is under a state illustrated in FIG. 1, where the second enlarged diameter portion 12 of the inner tube 10 is press fitted in the second supporting portion 22 of the outer tube 20, and the first enlarged diameter portion 11 of the inner tube 10 and the first supporting portion 21 of the outer tube 20 are pressed against each other by the elastic force of the elastic bush 30. Accordingly, the steering shaft 1 is supported in a position illustrated in FIG. 1 under the condition that the relative axial movement between the inner tube 10 and the outer tube 20 is restricted.

When the predetermined or greater load is applied to the steering shaft 1, and the steering shaft 1 moves in the axial direction thereof with the inner tube 10, the first enlarged diameter portion 11 of the inner tube 10 comes off the first supporting portion 21 of the outer shaft 20 and off the elastic bush 30, and the second enlarged diameter portion 12 of the inner tube 10 comes off the second supporting portion 22 of the outer tube 20. The load that causes the steering shaft 1 to start moving is a load for starting a movement of the steering shaft 1. The first and the second enlarged diameter portions 11 and 12, the first and the second supporting portions 21 and 22, and the elastic bush 30 constitute a portion for determining the load for starting the movement. By adjusting any one of the outer diameters of the first and the second enlarged diameter portions 11 and 12, the inner diameters of the first and the second supporting portions 21 and 22, a sheet-metal thickness of the elastic bush 30, a total number of the protrusions 32, and the height of each protrusion 32, the load for starting the movement is set at an appropriate and stable value without an occurrence of change with time or temperature.

Figure 7:
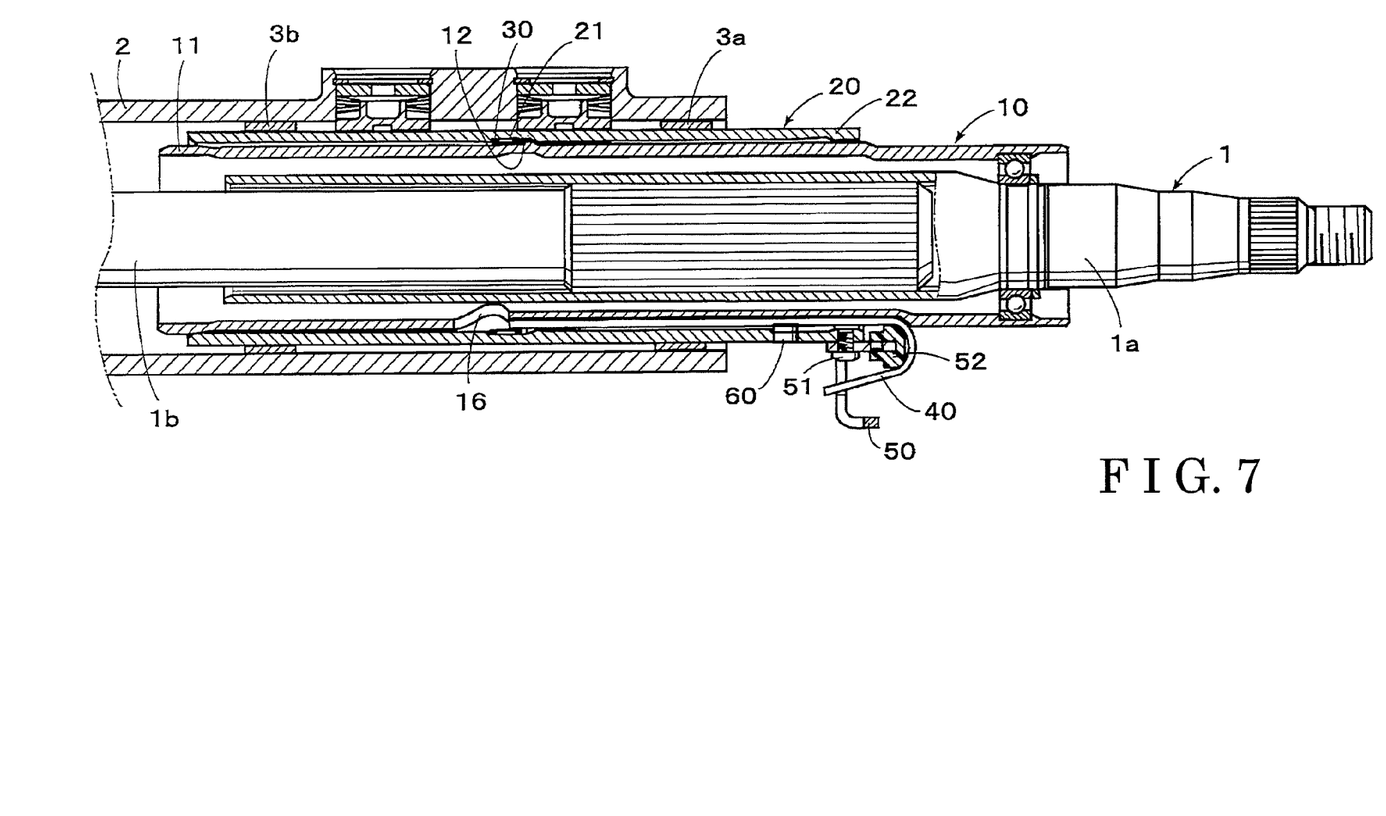
FIG. 7 is a cross-sectional view showing an operation state of the energy absorbing steering column according to the embodiment of the present invention.
Figure 8:
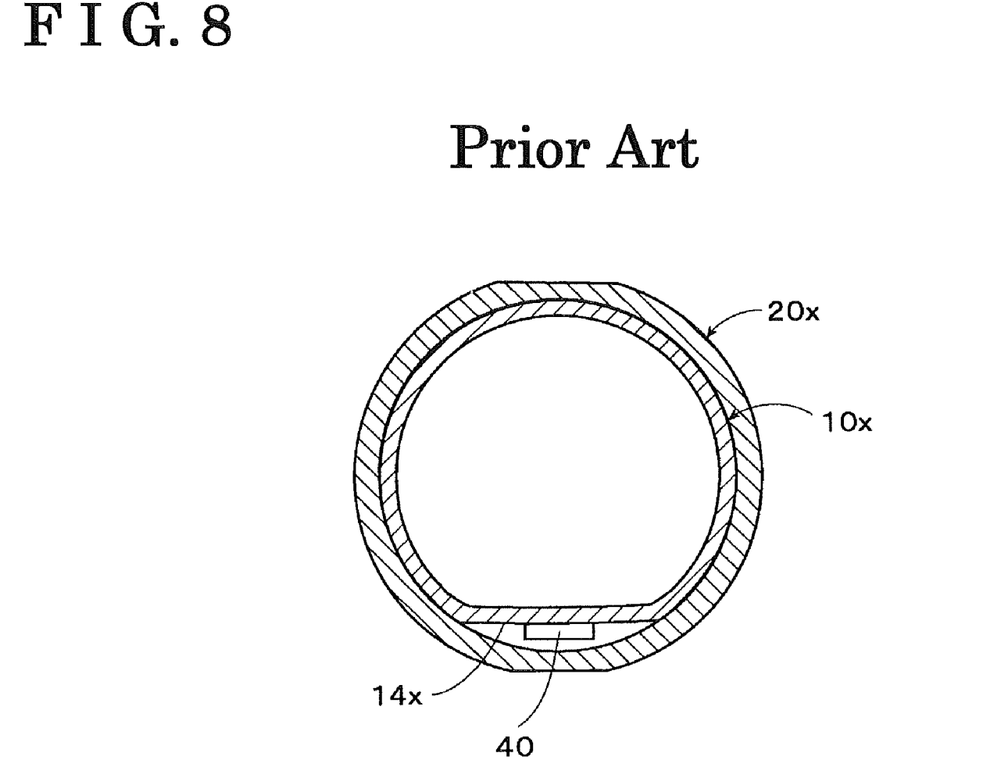
FIG. 8 is an enlarged cross-sectional view illustrating a conventional outer tube and a conventional inner tube.

When a still greater load is applied to the steering shaft 1, the plate 40 moves in a front direction of the vehicle while being guided by the guiding portion 50. When moving, the plate 40 undergoes plastic deformation and the inner surface of the lateral U shaped portion slides on an outer surface of the contact portion 52 of the guiding portion 50. A state of the plate 40 illustrated in FIG. 1 thus turns to a state illustrated in FIG. 7 while so-called an ironing load is being applied. That is, in this embodiment, the plate 40, the guiding portion 50 and the contact portion 52 constitute a portion for applying a load during the movement. The ironing load is adjusted by adjusting at least either one of a width and the sheet-metal thickness of the plate 40. Alternatively, the above-mentioned ironing load is set to a desired load by forming a protrusion, a depression, a notch or the like on the plate 40. In the meantime, a stroke of the steering shaft 1, from which the ironing load is applied, is set by adjusting the clearance (referred to as Ls in FIG. 5) between the inner surface of the lateral U shaped portion of the plate 40 and the outer surface of the contact portion 52 of the guiding portion 50.

The energy absorbing steering column having the above-mentioned structure ensures desired energy absorption characteristics as follows. First, when the load is applied to the steering shaft 1 and the load exceeds the above-mentioned load for starting the movement, the inner tube 10 starts moving relative to the outer tube 20. That is, the inner tube 10 moves relative to the outer tube 20 against frictional force working between the second enlarged diameter portion 12 of the inner tube 10 and the second supporting portion 22 of the outer tube 20, and against the frictional force working between the elastic bush 30 and each of the first enlarged diameter portion 11 and the first supporting portion 21. When the stroke of the steering shaft 1 exceeds a predetermined stroke, the inner tube 10 moves freely relative to the outer tube 20 in the axial direction.

When the steering shaft 1 makes a further stroke beyond a distance of the clearance between the inner surface of the lateral U shaped portion of the plate 40 and the outer surface of the contact portion 52 of the guiding portion 50, the ironing load is applied. Then, the steering shaft 1 and the inner tube 10 move together as a unit relative to the outer tube 20 under a condition that an approximately constant load is applied to the steering shaft 1 by the portion for applying the load during the movement. As a result, energy is appropriately absorbed during the stroke of the steering shaft 1, that is, even while the steering shaft 1 is moving.

As described above, the energy absorbing steering column of this embodiment includes the portion for determining the load for starting the movement, which is constituted by the first and the second enlarged diameter portions 11 and 12, the first and the second supporting portions 21 and 22, and the elastic bush 30, and the portion for applying the load during the movement, which is constituted by the plate 40, the guiding portion 50 and the contact portion 52. Accordingly, the load for starting the relative axial movement between the inner tube 10 and the outer tube 20, and the load during the movement are adjusted independently of each other. Further, the load for starting the movement is easily and appropriately set by determining a shape or a size of the first enlarged diameter portion 11, the second enlarged diameter portion 12, the first supporting portion 21 or the second supporting portion 22, by providing the appropriate total number of the protrusions 32 of the elastic bush 30, or by applying the appropriate height of each protrusion 32.

The portion for determining the load for starting the movement may be constituted only by the second enlarged diameter portion 12 and the second supporting portion 22 each located on the rear side of the vehicle, or only by the first enlarged diameter portion 11, the first supporting portion 21 and the elastic bush 30 each located on the front side of the vehicle. Further, any one of these portions or the elastic bush may be applied in a combination with the above-mentioned portion for applying the load during the movement.

According to this embodiment, the outer tube 20 includes the first supporting portion 21 formed on the inner surface of the outer tube 20 at the predetermined distance in the axial direction of the outer tube 20 from the second rear open end and the second supporting portion 22 formed on the inner surface of the outer tube 20 near the second rear open end. The inner tube 10 includes the first enlarged diameter portion 11 formed near the first front open end and the second enlarged diameter portion 12 formed at the predetermined distance in the axial direction of the inner tube 10 from the first front open end. The elastic bush 30 is provided between the first enlarged diameter portion 11 and the first supporting portion 21 for applying the elastic force in the radial direction of the elastic bush 30. Consequently, the diameter difference between the first enlarged diameter portion 11 and the first supporting portion 21, and the height of the protrusion 32 are set so that the first enlarged diameter portion 11 and the first supporting portion 21 respond to the axial load relatively insensitively but are displaced relatively easily by the external force, compared to the second enlarged diameter portion 12 and the second supporting portion 22 do. On the contrary, the press fit allowance of the second enlarged diameter portion 12 and the second supporting portion 22 is set so that the second enlarged diameter portion 12 and the second supporting portion 22 respond to the axial load relatively sensitively but it is harder for the second enlarged diameter portion 12 and the second supporting portion 22 to be displaced relatively easily by the external force, compared to the first enlarged diameter portion 11 and the first supporting portion 21 do. Thus, the load for starting the movement of the inner tube 10 relative to the outer tube 20 in the axial direction is set easily and appropriately and, at the same time, the necessary rigidity is ensured by the structure obtained at low cost.

According to this embodiment, the inner tube 10 includes the reduced diameter portion 13 formed between the position where the second enlarged diameter portion 12 is supported by the second supporting portion 22 and the position near the first rear open end, wherein the part of the circumference of the reduced diameter portion 13 is continuously reduced.

According to this embodiment, the inner tube 10 includes the flat portion 14 formed between the position where the second enlarged diameter portion 12 is supported by the second supporting portion 22 and the position near the first rear open end, wherein the part of the outer circumferential surface of the reduced diameter portion 13 is cut and removed.

According to this embodiment, the inner tube 10 includes the plate 40 securely attached to the flat portion 14, the outer tube 20 includes the guiding portion 50 guiding the plate 40 to move in the axial direction of the outer tube 20, and the plate 40 is accommodated between the outer circumferential surface of the reduced diameter portion 13 and the inner surface of the outer tube 20 in the manner that the plate 40 is bent so that the free end portion thereof is inserted into the guiding portion 50 and that a free movement of the free end portion in the axial direction of the outer tube 20 is allowed.

Consequently, the part of the outer circumferential surface of the reduced diameter portion 13 formed on the inner tube 10 is cut and removed to form the flat portion 14. As a result, the section modulus of the inner tube 10 is greater than that of the conventional inner tube 10x, on which the conventional flat portion 14x is formed by the conventional method, thereby easily ensuring the necessary rigidity. Further, according to the above-mentioned structure, the plate 40 is easily arranged, and reliably supported while being guided by the guiding portion 50 in order for absorbing the energy.

According to this embodiment, the inner tube 10 includes the lock hole 16 and the outer tube 20 includes the lock pin 60 engageable with the lock hole 16 at the front side wall of the lock hole 16 in the front-rear direction of the vehicle so that the axial movement of the inner tube 10 in the rear direction of the vehicle relative to the outer tube 20 is restricted by causing the lock pin 60 to be engaged with the lock hole 16, the lock hole 16 being free from engagement with the lock pin 60 at the rear side wall the lock hole 16.

According to this embodiment, the elastic bush 30 includes the cylindrical portion 31 having the C-shaped cross section and the plurality of protrusions 32 aligned on the cylindrical portion 31 in the circumferential direction thereof.

According to this embodiment, the elastic bush 30 is made of metal.

According to this embodiment, the metal is stainless steel.

According to this embodiment, the protrusions 32 are formed by way of drawing and aligned on the cylindrical portion 31 in the circumferential direction thereof with the predetermined spaces between the protrusions adjacent to each other.

Consequently, the axial movement of the inner tube 10 relative to the outer tube 20 in the rear direction of the vehicle is prevented by a simple structure, thereby reliably preventing the inner tube 10 from coming off the outer tube 20 in the rear direction of the vehicle. Further, the load for starting the movement of the inner tube 10 relative to the outer tube 20 in the axial direction is set easily and appropriately by structuring the elastic bush 30 as described above.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An energy absorbing steering column comprising:
a first cylindrical member accommodating a steering shaft of a vehicle and rotatably supporting the steering shaft about an axis thereof;
the first cylindrical member including a first front open end and a first rear open end in a front-rear direction of the vehicle, a first enlarged diameter portion formed near the first front open end and a second enlarged diameter portion formed at a predetermined distance in an axial direction of the first cylindrical member from the first front open end;
a second cylindrical member accommodating the first cylindrical member, normally supporting the first cylindrical member in a predetermined position and allowing the first cylindrical member to axially move relative to the second cylindrical member upon application of a load greater than a predetermined value to the steering shaft;
the second cylindrical member including a second front open end and a second rear open end in the front-rear direction of the vehicle, a first supporting portion formed on an inner surface of the second cylindrical member at a predetermined distance in an axial direction of the second cylindrical member from the second rear open end, and a second supporting portion formed on the inner surface of the second cylindrical member near the second rear open end;
an elastic bush provided between the first enlarged diameter portion and the first supporting portion for applying elastic force in a radial direction of the elastic bush and supporting the steering shaft to restrict an axial movement of the first cylindrical member relative to the second cylindrical member;
the elastic bush being positioned in a recess in the first supporting portion of the second cylindrical member; and
wherein the first cylindrical member includes a reduced diameter portion formed between a position where the second enlarged diameter portion is supported by the second supporting portion and a position near the first rear open end, wherein a part of a circumference of the reduced diameter portion is continuously reduced.

2. The energy absorbing steering column as set forth in claim 1, wherein the first cylindrical member includes a flat portion formed between the position where the second enlarged diameter portion is supported by the second supporting portion and the position near the first rear open end, wherein a part of an outer circumferential surface of the reduced diameter portion is cut and removed.

3. The energy absorbing steering column as set forth in claim 2, wherein the first cylindrical member includes an elongated elastic plate member securely attached to the flat portion, the second cylindrical member includes a guiding portion guiding the elongated elastic plate member to move in the axial direction of the second cylindrical member, and the elongated elastic plate member is accommodated between the outer circumferential surface of the reduced diameter portion and the inner surface of the second cylindrical member in a manner that the elongated elastic plate member is bent so that a free end portion thereof is inserted into the guiding portion and that a free movement of the free end portion in the axial direction of the second cylindrical member is allowed.

4. The energy absorbing steering column as set force in claim 1, wherein the first cylindrical member includes a lock hole and the second cylindrical member includes a lock pin engageable with the lock hole at a front side wall of the lock hole in the front-rear direction of the vehicle so that the axial movement of the first cylindrical member in a rear direction of the vehicle relative to the second cylindrical member is restricted upon the lock pin engaged with the lock hole, the lock hole being free from engagement with the lock pin at a rear side wall of the lock hole.

5. The energy absorbing steering column as set force in claim 1, wherein the elastic bush includes a cylindrical portion having a C-shaped cross section and a plurality of protrusions aligned on the cylindrical portion in a circumferential direction thereof.

6. The energy absorbing steering column as set force in claim 1, wherein the elastic bush is made of metal.

7. The energy absorbing steering column as set force in claim 6, wherein the metal is stainless steel.

8. The energy absorbing steering column as set force in claim 5, wherein the protrusions are formed by way of drawing and aligned on the cylindrical portion in the circumferential direction thereof with predetermined spaces between the protrusions adjacent to each other so as to inwardly protrude in a radial direction of the cylindrical portion.

9. The energy absorbing steering column as set forth in claim 1, wherein the recess possesses an enlarged internal diameter portion bounded on axial ends by smaller internal diameter portions of the second cylindrical member.

10. The energy absorbing steering column as set forth in claim 1, wherein a space is provided between the first cylindrical member and the second cylindrical member and extends between the first supporting portion and the second supporting portion.

* * * * *